2,769,828

PRODUCTION OF IRON BISCYCLOPENTADIENYL

Robert P. Sieg, Berkeley, Calif., assignor to California Research Corporation, San Francisco, Calif., a corporation of Delaware No Drawing. Application January 2, 1953,
Serial No. 329,467

12 Claims. (Cl. 260—439)

This invention relates to an improved process for the production of iron biscyclopentadienyl and particularly to a cyclic process involving the reaction of elemental iron with cyclopentadiene and its derivatives.

According to S. A. Miller, J. A. Tebboth and J. F. Tremaine, Journal of the Chemical Society, February, 1952, page 632, iron biscyclopentadienyl ($FeC_{10}H_{10}$) may be prepared by reacting cyclopentadiene in nitrogen with reduced iron in the presence of alumina and potassium oxide and preferably also molybdenum oxide at temperatures of 300° C. Subsequent to the preparation and discovery of this unusual compound, it was found that iron biscyclopentadienyl possessed exceptional properties which made the compound of considerable value in a number of commercial applications and particularly as an improving agent for motor fuels. The commercial possibilities of this compound for which the name "Ferrocene" has been suggested are in part predicated upon the existence of an economical and efficient process for preparing the compound.

The aforementioned Miller et al. preparation involved the reaction of cyclopentadiene in nitrogen with reduced iron in the form of a conventional "doubly-promoted synthetic ammonia catalyst" at 300° C. and atmospheric pressure. Under these conditions the formation of Ferrocene proceeded for only ten to fifteen minutes before the iron surface became passive to reaction. In order to reactivate or regenerate the iron reactant, the passive iron was oxidized at temperatures up to 450° C. in an atmosphere of nitrogen with increasing concentration of oxygen and finally in air followed by reduction with hydrogen gas at 450° C. This reactivation through oxidation and reduction of the passive iron reactant requires approximately a 12 to 18 hour time cycle for every 10 to 15 minute reaction cycle. Obviously, a process which requires such a disproportionate regeneration cycle cannot be considered efficient or attractive from a practical process standpoint.

In contrast with the excessive time differential in the regeneration cycle and the reaction cycle required by the foregoing procedure, a process has now been developed in which the time requirement of the regeneration cycle has materially been reduced and overall reaction conditions so improved as to provide an efficient cyclic process for the production of iron biscyclopentadienyl suited for commercial application.

According to this invention, iron biscyclopentadienyl or its derivatives may be produced by a cyclic process comprising the reaction of cyclopentadiene or its derivatives with elemental iron at a temperature in the range of 400 to 800° F. until the surface of the iron reactant becomes substantially passive to the reaction or the yields of the resulting iron biscyclopentadienyl or its derivatives substantially decrease, thereafter stopping the synthesis cycle and contacting the passive iron reactant at a temperature in the range of 600 to 1600° F. with an oxidizing gas possessing a free energy of oxidation at the temperature of oxidation within the range of +2000 to −5000 calories per gram atom of iron until at least approximately 3% by weight of the iron is oxidized, thereafter reducing the resultant iron oxide with a reducing agent under reducing conditions sufficient to form a reactive surface of elemental iron and thereafter returning to the synthesis cycle by engaging the reactivated elemental iron with the cyclopentadiene charge. This process may be considered as a sequence of reaction cycles involving the synthesis cycle, oxidation cycle, reduction cycle, and return to the synthesis cycle. In conducting the various reaction cycles, the solid iron reactant may remain static in a suitable reaction vessel equipped with the necessary piping and auxiliary equipment to supply the reaction conditions of the various cycles or the iron reactant may be moved through a series of reaction vessels or zones in a single vessel embodying the conditions of each reaction cycle and recycled back to the synthesis vessel or zone.

As a specific embodiment of the subject process, cyclopentadiene in vapor form and preferably diluted with an inert gas is introduced into contact with an elemental iron reactant of high surface area and preferably promoted by the presence of minor amounts of basic adjuvants at a synthesis temperature within the range of 400 to 800° F. and preferably in the range of 550 to 600° F. The production of recoverable iron biscyclopentadienyl proceeds rapidly on initial contact of the reactants and gradually falls off as the available iron surface becomes passive or inhibited. As a result, the synthesis cycle is continued only so long as any appreciable reactive or elemental iron surface is available which is evidenced by the formation of iron biscyclopentadienyl.

After the foregoing synthesis cycle, the passive iron reactant is regenerated by means of an oxidation and a reduction cycle. In the oxidation cycle the iron reactant is contacted with steam at a temperature in the range of 600 to 1600° F. and preferably 750 to 1150° F. The oxidation reaction is controlled to supply the stoichiometric amount of oxygen in the oxidizing gas required to oxidize at least about 3% by weight of the total iron in the iron reactant to the equilibrium oxide in the system—iron and water—at the temperature of oxidation. Thereafter, the resulting iron oxide which may be in the form of FeO or $Fe_3O_4$, depending upon the oxidizing temperature, is reduced to elemental iron in the reducing cycle by conventional reduction reaction with a reducing gas such as hydrogen, at temperatures in the range of 600 to 1600° F. The temperatures of the various reaction cycles are preferably chosen to avoid a wide temperature swing between the cycles and thereby provide a favorable heat balance throughout the cyclic process. However, other reaction variables must also be correlated for optimum process conditions as will be brought out in the subsequent discussion.

After substantial reduction of the oxidized iron reactant, and particularly the available surface of the reactant, in the reduction cycle, the resulting regenerated or reactivated iron is again brought into contact with the cyclopentadiene charge in the synthesis cycle to close the cyclic process. Under these conditions of operation, reaction times have been attained in the various cycles of which the following are representative: synthesis cycle—30 to 90 minutes; oxidation cycle—15 to 30 minutes; and reduction cycle—about 60 minutes. Accordingly, the present invention process for the production of iron biscyclopentadienyl provides an efficient cyclic process in which the time differential between the production or synthesis cycle and the regeneration cycles substantially approaches unity as contrasted with the prior art process which allows only a 10 to 15 minute synthesis for every 12 to 18 hour regeneration cycle. Furthermore, the present cyclic process has attained yields of iron biscyclopentadienyl of greater than threefold the yields reported by Miller et al., supra.

In general, the reaction involved in the synthesis cycle is the production of iron biscyclopentadienyl or its derivatives by the reaction of elemental iron and cyclopentadiene or derivatives thereof containing substituents which are inert to the basic reaction. The elemental iron reactant may be obtained by the reduction of a variety of natural and synthetic iron oxides or by the decomposition of iron carbonyl or the heating of an iron salt of an organic acid such as ferrous oxalate. Suitable sources of substantially pure iron oxide are high-grade hematite and magnetite from natural deposits, mill scale from the steel industry and by-product pyrites ash from the sulfuric acid industry. If desired, a synthetic elemental or reduced iron reactant may be prepared by precipitation of a hydrous oxide of iron from a water solution of any iron salt, such as ferric sulfate, with a base such as ammonium hydroxide and the hydrous oxide gel washed, dried, subdivided, calcined and reduced.

The iron reactant may be employed in the form of particles obtained by sizing the original material by suitable means such as grinding, extruding or pelleting or may be supported on a high surface area carrier. In the latter case, for example, a solution of a soluble iron salt, such as ferric nitrate, may be mixed with a soluble salt of metal oxide carrier, such as aluminum chloride, the hydrous oxide precipitated with a base, such as ammonium hydroxide, and the hydrous oxide gel washed, dried, subdivided by grinding, extruding or pelleting and thereafter calcined and reduced. Alternatively, bead-form material may be obtained by the well-known technique of mixing the components of the gel in a flow system and very rapidly thereafter jetting the mixture into a water-immiscible medium to secure the co-precipitated gel in the form of drops and subsequently washing, drying, calcining and reducing as previously. A supported iron reactant comprising reduced or elemental iron on porous aluminum oxide is thus obtained, which may be replenished in iron content when spent by impregnating the support with a soluble iron salt and then precipitating, calcining and reducing as previously. Alternatively, the porous carrier may be impregnated with iron by decomposing iron carbonyl on the carrier or by condensing ferric chloride vapor on the carrier and reducing.

Since the basic synthesis reaction involves elemental iron in the solid form and cyclopentadiene in vapor form within the temperature range of 400 to 800° F., a high surface area in the elemental iron reactant is desirable. The foregoing methods of preparing the iron reactant are normally satisfactory with regard to surface area since either the oxide is reduced to give a porous open structure or the iron is deposited on a highly porous carrier. Furthermore, the present method of regenerating or reactivating the iron reactant mass which has declined in activity or become passive, even though the iron is still available, through oxidation of the iron followed by reduction tends to restore the desired surface characteristics.

Although elemental iron may be used per se in the synthesis reaction, the reactivity of the iron reactant may be further enhanced by the addition of alkali metal compounds, materials which facilitate condensation, such as the oxides $Al_2O_3$, $CaO$, $BaO$, $B_2O_3$, $MgO$, $V_2O_5$, $ZrO_2$, $SiO_2$, surface active substances such as silica gel, alumina, kieselguhr, and the like, and materials which facilitate dehydrogenation such as the oxides of chromium, molybdenum and vanadium. These adjuvants, or promoters, may be added to the iron base by simple impregnation or by co-precipitation and, in the case of surface active carriers, the latter may be impregnated with soluble salts of the desired metals followed by drying and calcining. Except for the iron and surface active substances, such as silica gel, alumina, and kieselguhr, the adjuvant or promoter materials are normally present in the final iron reactant in amounts between about 0.1 and 10% by weight.

As an example of the preparation of a promoted elemental iron reactant, iron and aluminum nitrates were co-precipitated with ammonium molybdate, ammonium hydroxide and potassium hydroxide and the precipitate warmed, dried, subdivided, calcined and reduced with hydrogen to yield an iron reactant of final composition by weight as follows: Fe—90%; $Al_2O_3$—8%; $Mo_2O_3$—1%; $K_2O$—1%.

The organic charge, namely cyclopentadiene, may be obtained from numerous sources and may be used in the reaction as the sole organic component of the charge gas or in admixture with other hydrocarbon components. Mono- and dicyclopentadiene occur in the liquid mixture of hydrocarbons produced in the manufacture of coal gas, carburetted water gas, and oil gas as well as generally in the cracking of petroleum oils. A $C_5$ fraction from a cracked petroleum naphtha, for example, may contain about 5% of cyclopentadiene together with other diolefins such as isoprene and piperylene, olefins such as cyclopentene, and the normal pentenes and saturated $C_5$ hydrocarbons. Recovery of cyclopentadiene from such mixtures presents difficuties because of the number of close boiling and closely related hydrocarbons, but may be accomplished if desirable by a combination of fractional distillation and extractive distillation. It has been found, however, that the foregoing $C_5$ cut from a cracked petroleum naphtha may of itself be utilized in toto as the charge gas in the synthesis reaction. Aternatively, this $C_5$ fraction may be further dehydrogenated to increase the yield of cyclopentadiene prior to its introduction as the charge gas to the process.

For the practice of the present invention process, the monocyclopentadiene is the desired organic reactant, but since dicyclopentadiene is decomposed at its boiling point (about 338° F.) to the monomer and the preferred reaction temperatures for the synthesis of iron biscyclopentadienyl range from 400 to 800° F. either the monomer or the dimer will serve as the organic charge. Treatment of the commercial mono- and dicyclopentadiene for removal of polar compounds, for example sulfur containing compounds, using treating agents such as caustic and monoethanolamine has been found beneficial to increase the yield of the iron biscyclopentadienyl.

In the synthesis reaction the elemental iron reacts with two mols of cyclopentadiene to form one mol of iron biscyclopentadienyl and one mol of hydrogen. The principal side reaction is the polymerization of cyclopentadiene which has a direct effect upon the ultimate yield of desired product and also is at least partially responsible for the inhibition or loss of activity in the iron reactant. Accordingly, conditions of reaction in the synthesis cycle are preferably selected which would tend to minimize and are unfavorable to the polymerization reaction. Thus, it is desirable to operate at low pressures or in the presence of an inert diluent gas. To this effect the cyclopentadiene is preferably diluted prior to heating to reaction temperature with an inert non-oxidizing gas such as helium, nitrogen or methane. Dilution of the cyclopentadiene to 15 volume percent had been found satisfactory. In addition to the single component diluents, the cyclopentadiene may be charged in the form of a gas stream from which the cyclopentadiene is normally recovered, such as the $C_5$ olefin cut from thermal or catalytic cracking operations which may or may not have been subjected to further dehydrogenation to increase the cyclopentadiene content. A practical lower limit for the synthesis reaction, which is mildly exothermic is 400° F. As the temperature is increased, conversion increases until an optimum is reached beyond which temperature undesirable side reactions become predominant. A practical upper temperature limit has been found to be about 800° F. Within this range of 400 to 800° F., a desirable balance between rate and equilibrium considerations, both in the synthesis and polymerization reactions, has been found to lie in the range of 550 to 600° F.

The space rate at which the synthesis cycle is conducted has not been found to be critical and will depend upon the reactor design and process system employed. By way of example, when operating a reactor unit employing the elemental iron reactant as a static fixed bed with an on stream period of 0.5 hour at 570° F. the space rate in the synthesis circle was 0.14 liquid (60° F.) volumes of cyclopentadiene per superficial volume of reaction space per hour. The conversion of cyclopentadiene to iron biscyclopentadienyl was 50% and the ultimate yield which would be obtained by recycling effluent cyclopentadiene was in excess of 90%. Under these conditions, space rates from about 0.05 to about 0.25 have been employed in the synthesis cycle without any material deviation in the results obtained.

During the synthesis cycle the resulting iron biscyclopentadienyl is withdrawn from the reactor in vapor form with the unreacted cyclopentadiene from which it is easily separated and recovered in conventional recovery systems. The unreacted cyclopentadiene with its carrier gas may then be recycled back to the synthesis reactor with the incoming charge. The synthesis reaction is continued until the surface of the iron reactant substantially loses its reactivity and the yields of iron biscyclopentadienyl are materially reduced when operating in a static or fixed bed system. On the other hand, when operating in a flowing system in which the solid iron reactant is continuously circulated through the respective cycles, the rate of flow of the iron reactant through the synthesis cycle may be so designed to give the optimum balance between product yield and contact time with the organic charge.

Following the completion of the synthesis cycle, the exhausted or passive iron reactant is subjected or introduced into the initial regeneration cycle, namely, the oxidation cycle. In this reaction cycle the iron reactant is contacted with an oxidizing gas of critically defined characteristics. The efficiency of the regeneration cycle, and in fact the whole cyclic process is dependent upon the oxidation of the passive iron reactant with an oxidizing gas possessing a free energy of oxidation between $+2000$ to $-5000$ calories per gram atom of iron. The oxidizing gas may be composed of either single or multi-component oxidizing agents, such as steam, $CO_2$ or mixtures thereof.

The temperature at which the oxidation reaction is conducted may be chosen from a wide range between about 600° F. to about 1600° F. As a general proposition the temperature in the oxidation cycle should be kept as close as possible to the temperature employed in the synthesis cycle consistent with the desired rate or reaction in order to prevent too great a temperature differential between the various cycles in the process. Fundamentally, the oxidation reaction employing steam as the oxidizing gas is mildly exothermic, whereas the oxidation reaction employing carbon dioxide is mildly endothermic. Oxidation below about 600° F. has been found ineffective to produce the desired reactive iron surface, whereas at temperatures above about 1600° F. apparent sintering is encountered in the supported iron reactant which materially reduces the surface area of the reactant mass. The optimum oxidation temperature will naturally vary with the particular oxidizing gas employed, although it is generally preferred to operate within the range of 700 to 1200° F.

Generally, the space rate of the iron reactant in a flowing system or the on stream period for fixed bed operation in the oxidation cycle is so controlled as to supply the stoichiometric amount of oxygen in the oxidizing gas which is required to oxidize at least about 3% by weight of the total iron content in the iron reactant to the equilibrium oxide at the temperature of oxidation.

After the desired oxidation of the iron reactant to its lower oxides in the oxidation cycle, the oxidation reaction is terminated or the oxidized iron reactant is withdrawn from the oxidation zone and the reactant mass is subjected to reduction in the final cycle of the process. Basically, the reduction cycle involves a simple reduction of the iron oxide to elemental iron, as practiced in conventional catalyst manufacture and the metallurgy industry. The oxidized iron reactant is reacted with a reducing gas, such as hydrogen or carbon monoxide, as well as mixtures thereof, at temperatures in the range of 600 to 1600° F. The particular conditions chosen for the reaction in the reduction cycle is dependent upon the desired balance between the reducing temperatures and the rate of reaction for the particular reducing agent employed. When employing carbon monoxide, the reducing reaction is slightly exothermic and for hydrogen the reaction is endothermic.

Generally, it is desirable to maintain a reaction temperature in the reduction cycle which does not involve too great a differential from the temperatures in the oxidation and synthesis cycles. However, the rate of the reduction reaction is considerably lower than the rate of the oxidation reaction at the same temperature. Accordingly, it may be desirable to operate the reduction cycle at a higher temperature than the oxidation cycle in order to obtain an increase in reduction rate and thereby maintain a more uniform time in the cycles. The reduction cycle or reaction in the reducing zone is carried out to a contact or residence time which is approximately that required to provide a stoichiometric quantity of reducing agent necessary to reduce the iron oxide content of the reactant mass to elemental iron. After substantial reduction of the iron oxide content of the reaction mass the iron reactant has been regenerated and presents a reactive elemental iron surface requisite for the synthesis reaction. In view of the fact that iron is consumed in the synthesis reaction, compensation must be made for the loss of iron in the operating conditions of the process and provisions provided for the replenishment of the iron reactant.

As an illustration of the process of the invention the following example is presented setting forth the effect of representative reaction variables in the various operating cycles as they affect the conduct of the present cyclic process. It was found convenient to determine the effect of reaction variables in a small laboratory apparatus. The apparatus consists essentially of a cylindrical reaction vessel connected at the inlet end to a manifold provided with means for introducing metered quantities of cyclopentadiene charge, oxidizing gas, or reducing gas, as well as an inert gas used to sweep the system free of air and purge the system between the reaction cycles. The outlet end of the reaction vessel is connected with an unpacked chamber maintained at atmospheric temperature in which the iron biscyclopentadienyl is condensed directly from the vapor to the solid stage in the form of yellow to orange needle crystals, which is followed in line by a low-temperature trap for condensing unreacted cyclopentadiene and a vent connection to permit fixed gases to leave the system. The reaction vessel consisted of a glass cylinder resistant to thermal shock measuring 2.5 cm., internal diameter, by 22.5 cm. in length. Beginning at the inlet end, the first third of the reactor was packed with an inert solid particulate material, such as fused alumina spheres, in order to provide a preheating section for bringing the reaction gases up to reaction temperature. The remaining two-thirds of the reactor was packed with the solid iron reactant. The entire length of the reactor was enclosed by an electrical heating element with means for controlling the flow of electrical current to the heating element and for measuring temperatures within the reaction vessel.

In order to maintain the process variables at a minimum, steam was used as the oxidizing gas and hydrogen was used as the reducing gas. The steam supply rate was controlled by means of a valve calibrated prior to operation by condensation of the steam and a trap was provided in the steam supply line to prevent entrance of condensate into the reaction system during the oxidation cycle. Nitrogen was used as the carrier gas for the cyclopentadiene. Cyclopentadiene was introduced in the vapor state by bubbling nitrogen at a known rate through liquid cyclopentadiene held at 70° F. by an electrical heater. The amount of cyclopentadiene vapor thus introduced was determined prior to operation by condensing the vapor out in a cold trap. The iron reactant charged to the reaction vessel varies from 143 to 146 grams with the exception of run 67 wherein the weight of the iron reactant was 160 grams.

In the synthesis cycle, the nitrogen-cyclopentadiene charge gas was introduced to the reactor at a rate of 25 liters per hour, which corresponds to a charge of cyclopentadiene of 15 cc. per hour. In the oxidation cycle, the steam was charged at a rate of 75 cc. of liquid $H_2O$ per hour. In the initial charging of the reaction vessel with a prepared iron reactant, the system is purged of air by passing through a nitrogen stream. Thereafter, the iron reactant is subjected to a complete reduction cycle after which it is again purged with nitrogen. The synthesis reaction data presented in the following table are obtained upon an iron reactant which has previously been subjected to the oxidation and reduction cycles as indicated for the particular run except in runs 63, 67, 71, 73 and 92 which were conducted on freshly prepared iron reactants.

a reactive surface of elemental iron and thereafter contacting the resulting reactive elemental iron reactant with the cyclopentadiene charge.

3. The process as defined in claim 2 in which the iron reactant contains promoting amounts of alkali metal oxides.

4. The process as defined in claim 2 in which the iron reactant contains promoting amounts of metal oxides which facilitate dehydrogenation.

5. The cyclic process of claim 2 in which the oxidizing gas is steam.

6. The cyclic process of claim 2 in which the oxidizing gas is carbon dioxide.

7. The cyclic process of claim 2 in which the oxidizing gas consists of a mixture of steam and carbon dioxide.

8. A cyclic process for the production of iron biscyclopentadienyl which comprises reacting cyclopentadiene with an iron reactant presenting a high surface area of elemental iron at a temperature in the range of 400 to 800° F. and recovering the resulting iron biscyclopentadienyl, contacting the reaction spent iron reactant with steam at a temperature in the range of 700 to 1400° F. to produce a surface of equilibrium iron oxide on said iron reactant, reducing the resulting oxidized iron re-

| No. | Composition of Iron Reactant [1] | Oxidation Cycle | | Reduction Cycle | | Synthesis Cycle | | Product Yield, gms. |
|---|---|---|---|---|---|---|---|---|
| | | Time, hrs. | Temp., °F. | Time, hrs. | $H_2$ Rate, liters/hrs. | Time, hrs. | Reactor Temp., °F. | |
| 48 | 90-8-1-1 | 1.0 | 1,150 | 8.0 | 50 | 1.0 | 570 | 3.1 |
| 59 [2] | 90-8-1-1 | 1.0 | 600 | 1.0 | 50 | 1.0 | 570 | 0.2 |
| 60 | 90-8-1-1 | 1.0 | 850 | 1.0 | 50 | 0.75 | 570 | 3.1 |
| 63 | 100-0-0-0 | | | 4.0 | 170 | 1.25 | 570 | 0.3 |
| 67 | 91-8-0-1 | | | 4.0 | 50 | 2.50 | 570 | 1.9 |
| 68 | 90-8-1-1 | 1.0 | 850 | 1.0 | 50 | 0.25 | 1,000 | 0.0 |
| 71 | 90-8-1-1 | | | 4.0 | 50 | 0.83 | 570 | 5.1 |
| 73 | 90-5-4-1 | | | 4.0 | 50 | 1.50 | 570 | 4.8 |
| 75 | 90-8-1-1 | 1.0 | 850 | 1.0 | 50 | 0.50 | 750 | 0.9 |
| 78 | 90-8-1-1 | 0.25 | 850 | 1.0 | 50 | 1.0 | 570 | 3.6 |
| 79 | 90-8-1-1 | 0.50 | 850 | 0.50 | 75 | 1.0 | 570 | 1.4 |
| 80 | 90-8-1-1 | 0.25 | 850 | 0.50 | 100 | 1.0 | 570 | 1.2 |
| 90 | 90-8-1-1 | 0.50 | 850 | 1.0 | 50 | 1.0 | 570 | 3.3 |
| 92 | 96-3-1-0 | | | 4.0 | 50 | 0.83 | 570 | 1.1 |
| 96 | 90-8-1-1 | 1.0 | 850 | 1.0 | 50 | 0.75 | 400 | 0.3 |

[1] Wt. percent Fe, $Al_2O_3$, $Mo_2O_3$ and $K_2O$ in order given.
[2] Reduction temperature 600° F.

Obviously, many modifications and variations of the invention as hereinbefore set forth may be made without departing from the spirit and scope thereof, and only such limitations should be imposed as are indicated in the appended claims.

I claim:

1. A cyclic process for the production of iron biscyclopentadienyl which comprises reacting a cyclopentadiene with an iron reactant possessing a surface of elemental iron at a temperature in the range of 400 to 800° F., contacting the reaction spent iron reactant with an oxidizing gas selected from the group consisting of steam and carbon dioxide at a temperature in the range of 600 to 1600° F. to produce a surface of equilibrium iron oxide on said iron reactant, reducing the resulting oxidized iron reactant with a reducing agent to produce a reactive surface of elemental iron and thereafter contacting the resulting reactive elemental iron reactant with the cyclopentadiene charge.

2. A cyclic process for the production of iron biscyclopentadienyl which comprises reacting cyclopentadiene with an iron reactant possessing a surface of elemental iron at a temperature in the range of 400 to 800° F., contacting the reaction spent iron reactant with an oxidizing gas selected from the group consisting of steam and carbon dioxide at a temperature in the range of 600 to 1600° F. under conditions necessary to supply the stoichiometric amount of oxygen in said oxidizing gas required to oxidize at least about 3% by weight of the total iron in the iron reactant to the equilibrium oxide at the temperature of oxidation, reducing the resulting oxidized iron reactant with a reducing agent to produce actant with a reducing gas at a temperature in the range of 600 to 1600° F. to produce a reactive surface of elemental iron and thereafter contacting the resulting reactive elemental iron reactant with the cyclopentadiene charge.

9. The cyclic process of claim 8 in which the iron reactant contains promoting amounts of an alkali metal oxide and a heavy metal oxide which facilitates dehydrogenation.

10. The cyclic process of claim 8 wherein the reaction temperature in the synthesis cycle is within the range of 550 to 600° F.

11. The cyclic process of claim 8 wherein the oxidation cycle is controlled to supply the stoichiometric amount of oxygen in the steam required to oxidize at least about 3% by weight of the total iron in the iron reactant to the equilibrium oxide at the temperature of oxidation.

12. The cyclic process of claim 8 wherein the reaction temperature in the oxidation cycle is maintained within the range of 750 to 1150° F.

References Cited in the file of this patent

UNITED STATES PATENTS 2,391,723    Mann _____ Dec. 25, 1945

OTHER REFERENCES

Mellor: Comprehensive Treatise on Inorganic & Theoretical Chemistry, vol. 13, page 356 (1934). (Copy in Div. 59.)

Miller et al.: J. Chem. Soc. (London), Feb. 1952, pages 632–637.